United States Patent
Allen et al.

(10) Patent No.: US 9,886,390 B2
(45) Date of Patent: Feb. 6, 2018

(54) INTELLIGENT CACHING OF RESPONSES IN A COGNITIVE SYSTEM

(71) Applicant: International Business Machines Corporation, Armonk, NY (US)

(72) Inventors: Corville O. Allen, Morrisville, NC (US); Florin G. Manaila, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 14/937,008

(22) Filed: Nov. 10, 2015

(65) Prior Publication Data

US 2017/0132141 A1     May 11, 2017

(51) Int. Cl.
*G06F 17/30* (2006.01)
*G06F 12/0888* (2016.01)
*G06N 99/00* (2010.01)

(52) U.S. Cl.
CPC ....... *G06F 12/0888* (2013.01); *G06N 99/005* (2013.01); *G06F 17/3048* (2013.01); *G06F 17/30654* (2013.01); *G06F 2212/60* (2013.01)

(58) Field of Classification Search
CPC .................................................. G06F 17/3048
See application file for complete search history.

(56) References Cited

U.S. PATENT DOCUMENTS

| | | | |
|---|---|---|---|
| 6,141,664 A * | 10/2000 | Boothby | ........... G06F 17/30348 |
| 6,408,360 B1 | 6/2002 | Chamberlain et al. | |
| 6,732,237 B1 | 5/2004 | Jacobs et al. | |
| 7,363,298 B2 | 4/2008 | Kadatch et al. | |
| 7,526,628 B2 | 4/2009 | Pullen et al. | |
| 7,853,633 B2 | 12/2010 | Poole | |
| 7,945,577 B2 * | 5/2011 | Altinel | ................ G06F 17/3048 |
| | | | 707/769 |
| 8,112,495 B2 | 2/2012 | Hazlewood et al. | |
| 8,713,672 B2 | 4/2014 | Radhakrishnan et al. | |

(Continued)

OTHER PUBLICATIONS

Chaudhuri, Surajit et al., "Probabilistic Information Retrieval Approach for Ranking of Database Query Results", ACM Transactions on Database Systems, vol. 31, No. 3, Sep. 2006, pp. 1134-1168.

(Continued)

*Primary Examiner* — Jialong He
(74) *Attorney, Agent, or Firm* — Stephen J. Walder, Jr.; Diana R. Gerhardt

(57) ABSTRACT

Mechanism are provided for implementing an intelligent response caching engine. The mechanisms receive a set of attributes to be used to cache responses to requests in a response cache and analyze a corpus of natural language text associated with the responses to requests to identify ranges of values associated with one or more of the attributes. The mechanisms generate a plurality of caching buckets based on the identified ranges of values associated with the one or more attributes and generate, for each caching bucket in the plurality of caching buckets, a corresponding cache key. The responses are stored in the response cache in association with a cache key corresponding to a caching bucket in which the response is a member. A request is subsequently processed by retrieving a cached response from the response cache.

18 Claims, 5 Drawing Sheets

(56) References Cited

U.S. PATENT DOCUMENTS

| | | | |
|---|---|---|---|
| 8,756,362 B1 | 6/2014 | Joshua et al. | |
| 8,996,504 B2 | 3/2015 | Alue et al. | |
| 2003/0065933 A1* | 4/2003 | Hashimoto | G06F 21/123 |
| | | | 713/194 |
| 2003/0200194 A1* | 10/2003 | Arnold | G06F 17/3048 |
| 2004/0260735 A1* | 12/2004 | Martinez | G06F 3/0613 |
| 2006/0095859 A1* | 5/2006 | Bocking | G06Q 10/109 |
| | | | 715/764 |
| 2007/0230283 A1* | 10/2007 | Castaneda | G06Q 10/10 |
| | | | 368/29 |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2012/0078062 A1* | 3/2012 | Bagchi | A61B 5/00 |
| | | | 600/300 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0290056 A1 | 10/2013 | Cooper | |
| 2014/0078163 A1 | 3/2014 | Cammert et al. | |
| 2014/0310470 A1* | 10/2014 | Rash | G06F 12/0862 |
| | | | 711/126 |
| 2014/0377735 A1* | 12/2014 | Byron | G09B 7/02 |
| | | | 434/362 |
| 2015/0169514 A1 | 6/2015 | Sah et al. | |
| 2016/0154783 A1* | 6/2016 | Hebert | G06F 17/2705 |
| | | | 707/755 |

OTHER PUBLICATIONS

Gurevich, Maxim et al., "Permutation Indexing: Fast Approximate Retrieval from Large Corpora", CIKM '13, Oct. 27-Nov. 1, 2013, pp. 1771-1776.

High, Rob, "The Era of Cognitive Systems: An Inside Look at IBM Watson and How it Works", IBM Corporation, Redbooks, Dec. 12, 2012, 16 pages.

Mccord, M.C. et al., "Deep parsing in Watson", IBM J. Res. & Dev. vol. 56 No. 3/4 Paper 3, May/Jul. 2012, pp. 3:1-3:15.

Smith, Barbara M., "Caching Search States in Permutation Problems", Principles and Practice of Constraint Programming—11th International Conference, CP 2005, Lecture Notes in Computer Science, vol. 3709, Oct. 1-5, 2005, 15 pages.

Sulaiman, Sarina et al., "Rough Set Granularity in Mobile Web Pre-Caching", IEEE, Eighth International Conference on Intelligent Systems Design and Applications, Nov. 2008, pp. 587-592.

Yuan, Michael J., "Watson and Healthcare, How natural language processing and semantic search could revolutionize clinical decision support", IBM developerWorks, IBM Corporation, Apr. 12, 2011, 14 pages.

\* cited by examiner

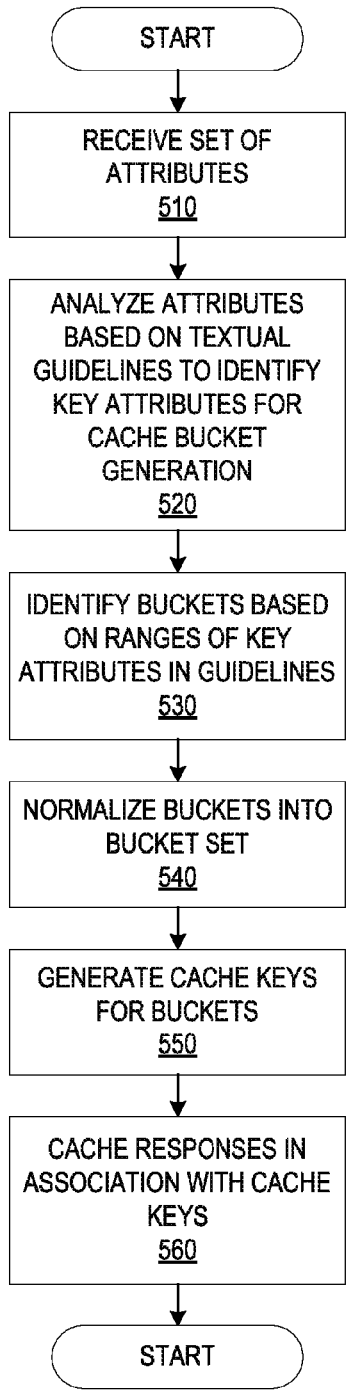
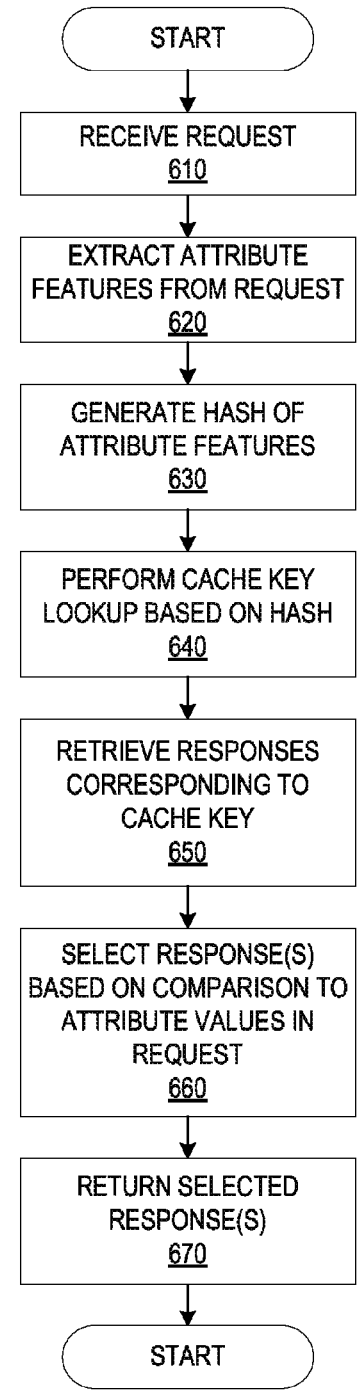
FIG. 5
FIG. 6

INTELLIGENT CACHING OF RESPONSES IN A COGNITIVE SYSTEM

BACKGROUND

The present application relates generally to an improved data processing apparatus and method and more specifically to mechanisms for performing intelligent caching of responses based on permutations of response attributes in a cognitive system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory having instructions which are executed by the processor to implement an intelligent response caching engine. The method comprises receiving, by the intelligent response caching engine of the data processing system, a set of attributes to be used to cache responses to requests in a response cache. The method further comprises analyzing, by the intelligent response caching engine, a corpus of natural language text associated with the responses to requests to identify ranges of values associated with one or more of the attributes in the set of attributes. Moreover, the method comprises generating, by the intelligent response caching engine, a plurality of caching buckets based on the identified ranges of values associated with the one or more attributes. In addition, the method comprises generating, by the intelligent response caching engine, for each caching bucket in the plurality of caching buckets, a corresponding cache key and storing, by the intelligent response caching engine, responses in the response cache in association with a cache key corresponding to a caching bucket in which the response is a member. Furthermore, the method comprises processing, by the intelligent response caching engine, a request by retrieving a cached response from the response cache.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is a flowchart outlining an example operation for intelligent caching of response to requests in accordance with one illustrative embodiment; and FIG. 6 is a flowchart outlining an example operation for retrieving a response from a response cache in accordance with one illustrative embodiment.

DETAILED DESCRIPTION

Figure 1:
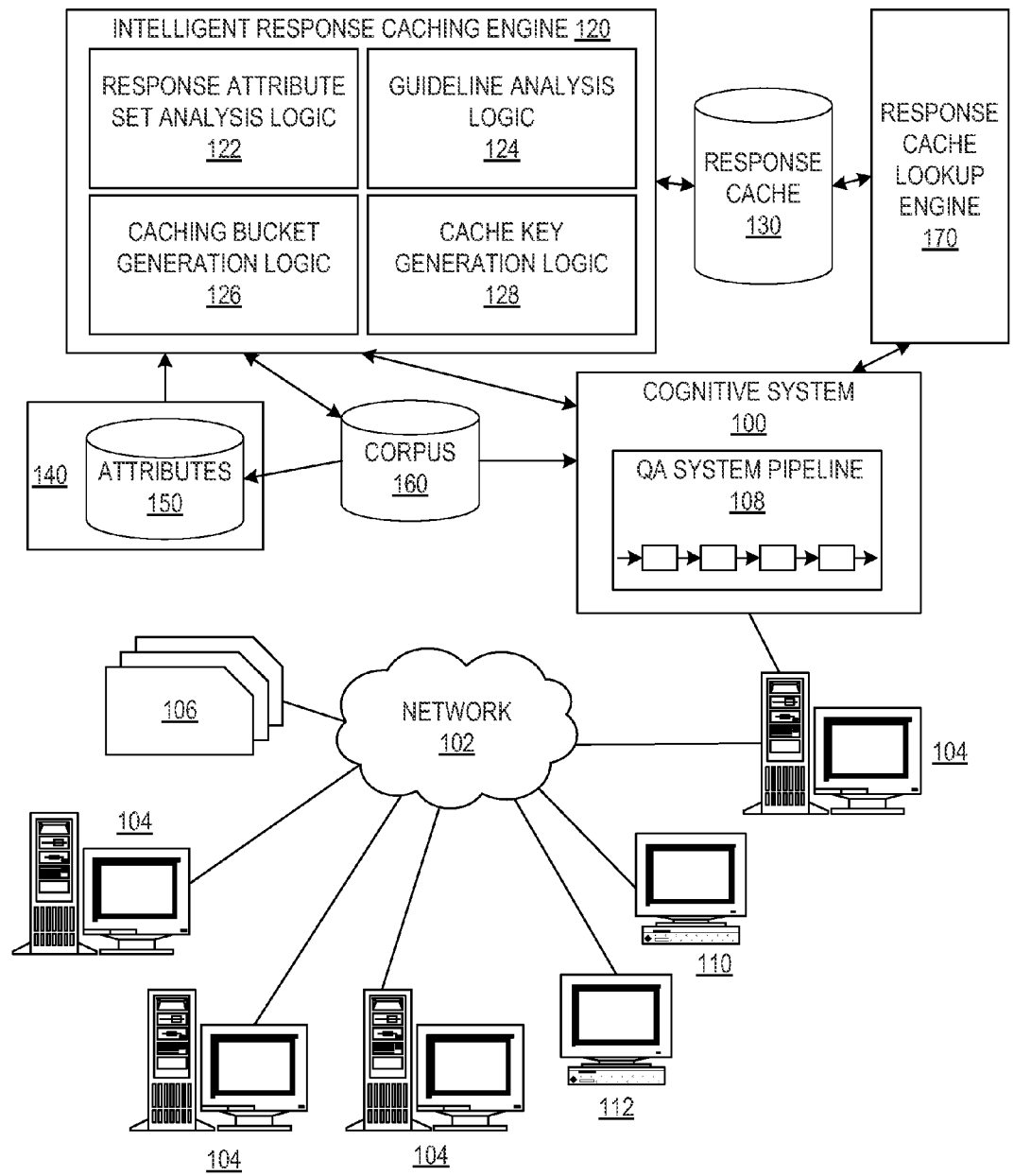
FIG. 1 depicts a schematic diagram of one illustrative embodiment of a question/answer creation (QA) system in a computer network.

The illustrative embodiments provide mechanisms for performing intelligent caching of responses based on permutations of response attributes in a cognitive system. The mechanisms improve the performance of a cognitive system by providing an intelligent caching system, method, and computer program product that improves response time of the cognitive system by utilizing dynamically created buckets of response attributes and utilizing those buckets (also sometimes referred to as "brackets") to identify cached responses to cognitive system requests submitted to the cognitive system. Each bucket corresponds to a set of permutations of the response attributes such that a single bucket may comprise a range of permutations with regard to one or more of the response attributes. For example, in a medical treatment recommendation cognitive system, if the age of the patient is a response attribute, then a single bucket may represent permutations of other attributes (e.g., cancer stage, mutation, diagnosis, etc.) within a range of ages from 50 to 60 years of age (the bucket) that have a same cognitive system response. In this way, permutations of response caching are saved, e.g., in the "age" example, rather than having to have a separate entry in the cache for each permutation of attributes for each of the ages 50, 51, 52, . . . , 60, a single bucket is utilized to represent the range of ages for which a set of responses are applicable. This reduces the size and complexity of the cache and increases access speed for retrieving correct responses by the cognitive system.

In order to generate the buckets for the cache, a set of response attributes is identified and an analysis of a corpus of documentation is analyzed with regard to these response attributes to identify response attributes that are predominant for generating responses to requests. Such analysis may include, for example, performing an analysis of a frequency of usage of the various response attributes in the set in the corpus of documentation. For example, an inverse document frequency (IDF) analysis may be performed that identifies which of the response attributes have the smallest frequency of occurrence in the corpus of documentation. Those having a relatively small occurrence frequency are more indicative of a particular response or responses, while those that are more frequent may be less indicative of a particular response or set of responses in some implementations. In other implementations, response attributes having a high frequency of occurrence may be considered to be of more importance to identifying a response or set of responses. Other statistical measures of occurrence of response attributes within the corpus of documentation may be used without departing from the spirit and scope of the illustrative embodiments. The frequency, IDF, or other statistical measure may be compared against one or more thresholds to select a subset of response attributes for use in defining buckets for caching purposes.

Based on the subset of response attributes selected for use in defining buckets of responses for caching, guidelines, rules, or other natural language text describing the prerequisites for particular responses to requests being correct for the request are analyzed to identify various ranges of these response attributes for which buckets may be generated. For example, a guideline, rule, or other natural language text may specify that a particular drug treatment should only be given to adult patients that are less than 50 years of age (i.e. a range of 18-50 years of age) and have stage IV cancer with the EFGR mutation. The ranges are then converted into a bucket that is normalized across the set of responses corresponding to the range of response attributes. Sub-buckets may also be generated and linked to the generated buckets based on analysis of the occurrence of responses within sub-ranges of the generated bucket.

Based on the set of response attributes and the normalized bucket attribute(s), a hash representation is generated for the cache key entry with additional key attribute qualifiers for easy access and indexing. An example of a key attribute qualifier is the mutation entry for a cancer stage, the race of the patient, or the like, which may be a single value. The correct responses to input requests that are predicated on the set of response attributes are stored in the cache as cache entries corresponding to the bucket and the associated cache key.

Thereafter, when a subsequent request is received, the cache is checked based on the generated buckets and responses are returned that match the cached key entry. That is, attributes specified in the request are used to generate a hash value which is then matched to a cache key entry to thereby identify the bucket of responses that are appropriate for the particular request. All of the responses may be returned as potential responses to the request. Alternatively, from the one or more responses that are retrieved, the particular correct response(s) to return is evaluated based on the particular attributes specified in the request, e.g., if the request specifies a patient that is 56 years old and has stage IV cancer with EFGR mutation, and the bucket includes responses for patients that are 40 to 60 but some responses are primarily for patients 50 years or older, then comparing the specific attribute values in the request to those of the response may identify a subset of the responses that are correct responses to return for the specific request.

It should be appreciated that the illustrative embodiments will be described in the context of a medical treatment recommendation system as an example of a cognitive system, however the present invention is not limited to such. To the contrary the mechanisms of the present invention and the illustrative embodiments may be utilized with any cognitive system in which a response is predicated upon a set of response attributes that can be represented as buckets of permutations. Examples of cognitive systems of this type include cognitive search engines, cognitive question and answer systems such as the IBM Watson™ cognitive system Question and Answer (QA) system available from International Business Machines (IBM) Corporation of Armonk, N.Y., or other similar cognitive systems that operated on natural language content using natural language processing techniques to analyze the natural language and generate results.

Through the use of an intelligent response caching mechanism as described herein, the number of permutations across a response attribute, in a set of response attributes, based on guidelines in natural language text, are reduced. For example, with regard to a medical treatment recommendation system, the number of permutations of a response attributes, such as age of the patient, based on medical treatment guidelines provided in natural language text documents directed to treating patients having a set of response attribute values, e.g., diagnosis, mutation, cancer stage, and age, is reduced. A statistical performance feature, where drugs associated with a treatment are cached based on not only the set of response attributes but also the efficacy of the drugs and the applicability of the drugs for patients, may be implemented using the mechanisms of the illustrative embodiments. Moreover, mechanisms that allow for dynamically identifying permutations leading to cache keys, within a set that is based on unique key attributes that help to define the set, are provided and used to generate new cache keys linked to the previously generated cache keys.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
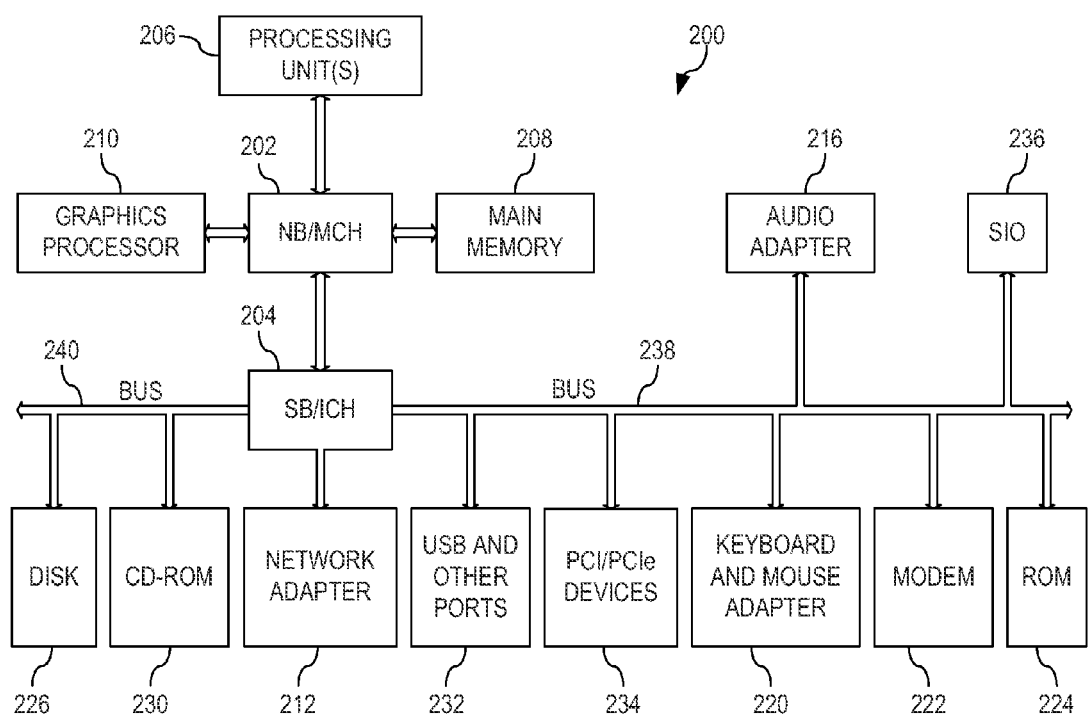
FIG. 2 is a block diagram of an example data processing system in which aspects of the illustrative embodiments are implemented.
Figure 3:
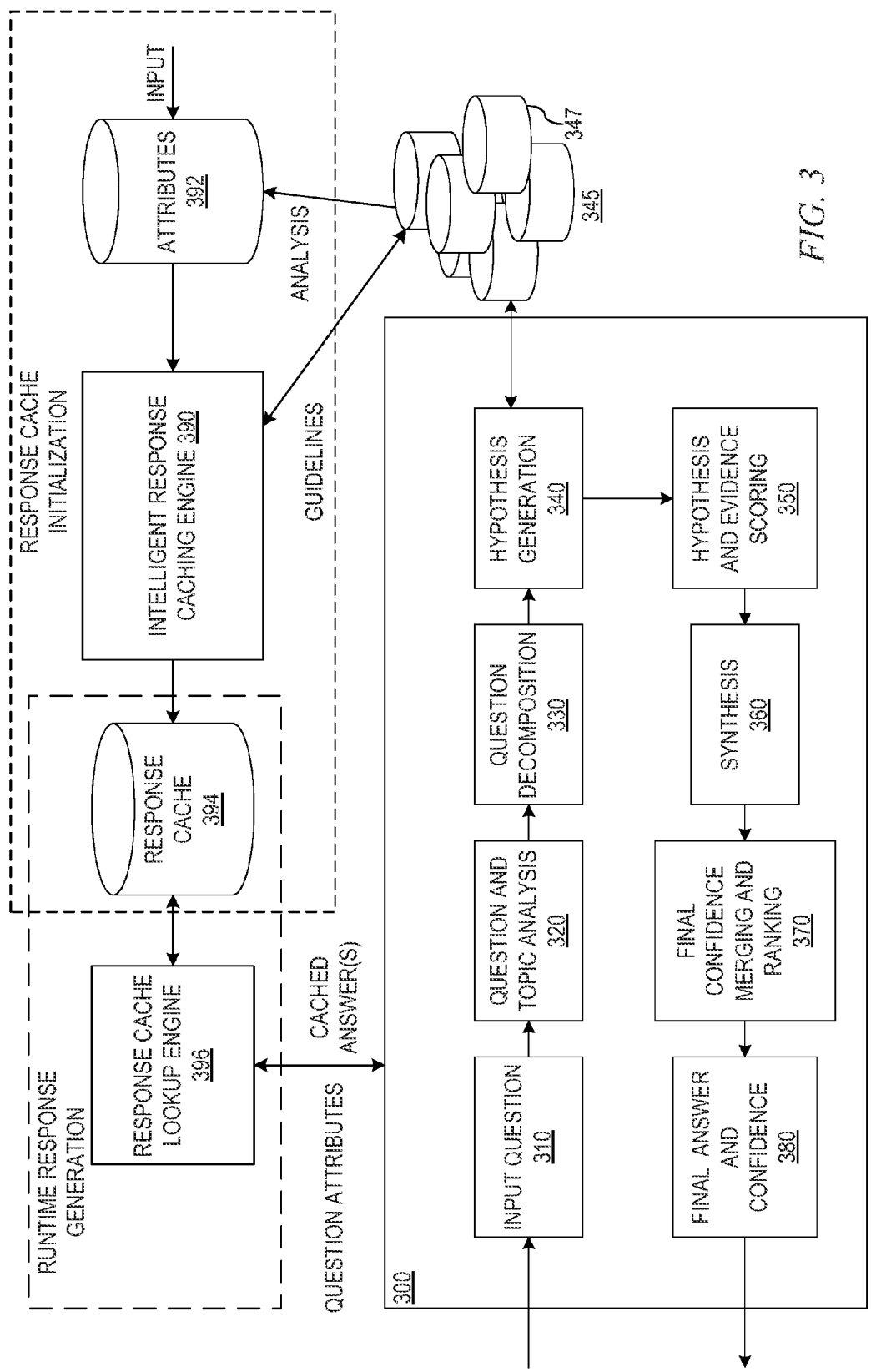
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As mentioned above, while a QA pipeline based cognitive system is used in the present description, the illustrative embodiments are not limited to such and any cognitive system employing natural language processing is intended to be within the spirit and scope of the present invention. As will be discussed in greater detail hereafter, with regard to a QA pipeline based cognitive system example, the illustrative embodiments are integrated in, augment, and extend the functionality of these QA mechanisms of the cognitive system with regard to intelligent caching of answers to input questions based on the dynamic generation of cache buckets based on response attributes determined to be indicative of sets of answers.

Thus, since the illustrative embodiments are described in the context of an example QA pipeline based cognitive system, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing an intelligent response caching engine 120 and a response cache lookup engine 170. The intelligent response caching engine 120 comprises response attribute set analysis logic 122, guideline analysis logic 124, caching bucket generation logic 126, cache key generation logic 128, and response cache 130. The intelligent response caching engine 120 operates as part of an initialization, corpus ingestion, or other configuration operation to configure the response cache 130 to cache responses to requests for quick retrieval when a response specifying certain combinations of response attributes is received using the generated cache buckets, as described hereafter. The operation of the intelligent response caching engine 120 may further by dynamically performed in response to the occurrence of events initiating a flush of the response cache 130. For example, such events may include a periodic flushing of the response cache 130 after an elapsed time, human user initiated cache flush, changes to guidelines occurring which initiate a cache flush, or the like.

The response attribute set analysis logic 122 receives a response attribute set 150 as part of input 140 from a user, data structure, or other source that specifically identifies the response attributes 150, or otherwise analyzes a corpus 160 to identify a set of response attributes 150, that are to be utilized for caching bucket generation and analysis. For example, the corpus 160 may comprise a set of documents representing guidelines, rules, or other natural language text (collectively referred to hereafter as "guidelines") for a plurality of medical treatments of a particular domain. The treatment guidelines may specify particular treatments, response attributes of patients that are suitable for administering the corresponding treatment, response attributes of patients that are not suitable for administering the corresponding treatment, details for administering the treatment to patients, side effects of the treatment, and other details of the treatment. These guidelines may be specified in natural language text which may be parsed and analyzed by the response attribute set analysis logic 122 to extract the response attributes applicable to the treatment. For example, a drug treatment for drug XYZ may state that the treatment is for all diagnoses having a mutation of "EFGR", stage IV (4) cancer, and patients of age 17 or above but not older than 60 years of age.

Many guidelines for many different combinations, or permutations, of response attributes and other attributes may be provided in the corpus 160 and may be analyzed by the response attribute set analysis logic 122 to extract a set of response attributes that are most indicative or influential in differentiating various treatments. The analysis may be done with regard to specified domains, e.g., cancer treatments, dental disease treatments, mental disease treatments, an accounting domain, security analysis domain, and the like. As such, the identification of the set of response attributes for use in generating caching buckets may be specific to the particular domain of the corpus 160 being utilized. Thus, there may be multiple sets of response attributes, for different domains, and corresponding different instances of response caches 130 for each of the corpora 160 and domains.

In identifying the set of response attributes to utilize in generated caching buckets, statistics about the various response attributes utilized in the guidelines may be used as a basis for selecting a set of response attributes for use in generating the caching buckets, e.g., the most frequently used, least frequently used, or the like. For example, a frequency calculation, inverse document frequency (IDF) calculation, or the like, may be used and compared to one or more thresholds to determine which of the response attributes to utilize as part of the set of response attributes.

Alternatively, the set of response attributes to utilize may be specified as input 140. This set of response attributes specified in the input 140 may be a default set of response attributes pre-configured into the intelligent caching system 120, may be a set of response attributes specified by a user, or the like. In still a further illustrative embodiment, the input 140 may specify a set of response attributes from which a subset is selected for use in generating caching buckets based on the statistical analysis previously described above. Any mechanism for selecting or specifying the response attributes to be used when generating caching buckets may be used without departing from the spirit and scope of the illustrative embodiment.

It should be appreciated that the response attributes are attributes that are common to a plurality of responses to requests and are indicative of features that distinguish the correctness of a response to a request, e.g., pre-requisites or exclusions for the response to be correct with regard to requests. Response attributes may take many different forms and may represent different types of attributes used as defining the correctness or incorrectness of a response to a particular request. In the medical treatment example implementation, the response attributes are attributes of the treatment and/or patients to which the treatment is to be given that indicates the treatment as being either valid or invalid for a particular patient. Combinations, or permutations, of the response attributes set forth a particular combination of response attributes for which a treatment is appropriate (valid) or inappropriate (invalid).

The guideline analysis logic 124 may provide the logic for analyzing the natural language text of the corpus 160 and extracting the set of response attributes 150 or otherwise selecting from the input 140 a subset of response attributes 150 for use in generating caching buckets. The guideline analysis logic 124 may further be used, based on having identified the response attributes 150 to be utilized for caching bucket generation, to identify ranges of response attributes specified within the guidelines in the corpus 160. That is, the natural language text may specify that certain responses are valid/invalid for particular ranges of response attributes. These ranges may be explicitly specified or inferred from natural language analysis of the text. For example, a range may be specified, for example as an age range "from 50 to 60 years of age" (which is interpreted to be inclusive of the endpoints of the range). In another example, the range may be specified as "adults less than 50 years old" which may be interpreted to be the range of 18 to 49, i.e. the term "adult" may be interpreted to be the age of majority within the domain, e.g., 18, and the phrase "less than 50 years old" may be interpreted to be ages that are less than 50 non-inclusive of the 50 year old age. Similarly, natural language text that specifies "not to be used by patients 60 years or older" may be interpreted to be the range 18 to 59, assuming that a minimum age of adulthood is required. Such analysis may be performed both with regard to inclusive ranges and exclusive ranges. Various natural language text analysis mechanisms may be employed by the guideline analysis logic 124 to determine ranges specified in the corpus 160 for the various guidelines associated with responses.

The ranges identified through analysis of the various guidelines in the corpus 160 may be converted to individual buckets by the caching bucket generation logic 126, where the buckets represent the ranges of the corresponding response attribute. For example, if through analysis of a guideline in the corpus 160 by the guideline analysis logic 124, a response attribute of age is identified and a range of age of 50 to 60 is identified, then a bucket for age 50-60 is generated. For another guideline, a different age range bucket of ages of 18-49 may be generated based on results of the response attribute and range analysis.

The buckets are then normalized by the caching bucket generation logic 126 across the various buckets so as to generate a smaller set of buckets by combining buckets having similar or overlapping corresponding ranges of response attributes. For example, if a first set of one or more buckets have an associated range for age of 50-60, and a second set of one or more buckets have an associated range of age of 55-60, then these buckets may be combined into an overall bucket of age range 50-60. The combining of buckets may take into consideration a frequency of occurrence of guidelines referencing these various ranges and comparing these frequencies of occurrence against one or more thresholds. For example, when combining buckets, while the larger range bucket may be maintained, sub-buckets may be established for sub-ranges within the range of the larger bucket for which the frequency of occurrence meets or exceeds a predetermined threshold frequency value. For example, if the second set of buckets is combined with the first set of buckets as in the example above, such that a single bucket covering the age range of 50-60 is utilized, analysis may be performed with regard to the frequency of occurrence of guidelines referencing the sub-range of 55-60. If the frequency of occurrence of guidelines referencing the sub-range of 55-60 is equal to or greater than a predetermined threshold value, e.g., 70% of the guidelines in the bucket corresponding to the age range 50-60 also are present within the sub-range of 55-60, then a sub-bucket may be generated and linked to the larger range bucket of 50-60. Thus, the evaluation may be a statistical measure of the sub-range/sub-bucket with regard to the larger range/super-bucket. Of course other measures for evaluating whether to generate a sub-bucket linked to the super-bucket may be used without departing from the spirit and scope of the present invention.

There can be multiple buckets within a single cache that is spread across a bucket for each attribute based on the guideline. For example, Age 50-60, and Mutation EGFR, EXON-20, EXON-19 are two buckets one for age and one for the set of mutations. Each bucket is derived and created based on analysis of a guideline and the set of values exceeding a predetermined or calculated threshold, for example, or otherwise meeting criteria of the guideline.

The normalized buckets that are defined using the caching bucket generation logic 126 are used by the cache key generation logic 128, along with the set of response attributes to generate a hash representation for the cache key entry with additional key attribute qualifier for easy access and indexing. An example of a hash key is a representation of the bucket, as a range of values, as a string for an attribute and the concatenation of the rest of the attributes or buckets. For example, a numeric may use the representation of a beginning number followed by a dash and an ending number to represent a range in a bucket, 50-60 is sequential numbers from 50-60 with the attribute it belongs to prepended. This would be AgeBracket=50-60 as a part of the representation. A delimiter can be used to separate each key attribute in the caching key whether it is a bucket or a single value, in one embodiment a comma may be used while a single value attribute would be Age=54. The qualifier of an attribute is the value or range of values defined for it, including an indication as to whether it is a bucket, a single value, or a mixed combination. For example, in a medical treatment recommendation cognitive system implementation, the cache key entry may comprise a hash value generated based on hashing the values of the response attributes corresponding to a diagnosis (Dx), a mutation (M), a cancer stage (Stage), and an age range (AgeBracket) attribute, e.g., cache key=hash(Dx=NSCLC, M=EFGR, Stage=IV, AgeBracket=50-60). In one embodiment, the response cache storage has index and hints associated with each cache indicating which attribute is a bucket within the cache and a range. The most frequently accessed hash of a cache key and the hash's representation are available for query based on this attribute based hint. For example, a field indicating that Age is bracketed and the Age range is 50-60 for this cache will expedite building a cache key and retrieving potential hashes of the key using a hash function.

The responses are then stored in the response cache 130 in association with their corresponding cache key entry pointing to the portion of the response cache 130 where these response entries are stored. The cache key entry is the hash value of the set of attributes and normalized bucket or sub-bucket. The responses corresponding to bucket or sub-bucket may be further analyzed to identify elements of the responses that may be cached in a sub-cache shared between the responses. For example, if the same drug is reference by a plurality of responses corresponding to the bucket or sub-bucket, then that drug may be stored in a sub-cache whose entry is linked to the response in the response cache 130. For example, if multiple responses in bucket A reference drug XYZ, then information about drug XYZ, e.g., drug label information, may be stored in a sub-cache (not shown) with a pointer from the responses in bucket A to the entry in the sub-cache for the drug XYZ. This is a further optimization for artifacts related to the answer or response that can be optimized by co-locating the cached data for retrieval across a set of entries in a bucket.

Upon a subsequent request being submitted to the cognitive system 100, the cache lookup engine 170 performs a lookup operation by hashing the response attributes associated with the response and matching the hash value with a cache key entry in the response cache 130. The cache lookup engine 170 performs several permutation generation tasks for each attribute, and their frequently used ranges and segments, to generate potential hash keys. The cache lookup engine 170 also uses a quick-look-up key table for entries that would satisfy a set of attribute values within the hash. For example, a request may contain the attributes Age=52, M=EGFR, Stage=III, and Dx=NCSLC. The cache lookup engine 170 may first query an index with the fixed values for potential cache hits on the predominantly single valued attributes such as Dx, or Dx and Stage. Then, the cache lookup engine 170 may build a set of buckets based on the index hints in the response cache, or a set of ranges based on the possible permutations. For example for numeric ranges of 5 sequential numbers plus or minus the given number, or a 10 sequential number bucket depending on the domain. This would not only look up numbers representing an Age attribute having a value of 52 but an AgeBracket=49-55 and another AgeBracket=50-60. Further an optimization for the numeric is to pull the brackets and perform a check if the given numeric is within the range of a bucket and generate the bucket string representation. Thus, in essence there are two ways to perform a cache matching, one is to pull the actual cache entry and parse each value and then verify that the values included are composed in the value or the bucket. A second way is to generate a key and then create the hash value from it, or a set of frequently used hash values or ranges that fit within the scope.

This leads to a bucket or sub-bucket of responses which are determined to be correct responses for the particular combination of response attributes that are used as part of the hash value. The responses in the bucket may then be further matched based on the specific values of the attributes of the request to select a response that is most appropriate for the particular request. The selected response, e.g., patient treatment, may then be used to index into a sub-cache to retrieve additional information for the response, e.g., cached drug information referenced by the response. In this way, the response is generated much more quickly than having to traverse a large cache having a separate entry for each possible permutation of response attributes as well as reduces the memory size requirements for such a cache.

Moreover, such mechanisms reduces the time for responding to a request than would be necessary in a system where processing of the corpus is performed with each request.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA system pipeline 300 operates in conjunction with the intelligent response caching engine 390 and response cache lookup engine 396 to facilitate quicker response to the input question 310 by utilizing the response cache bucket generation and response caching mechanisms described previously with regard to FIG. 1. In FIG. 3, the elements 390-396 and corpus 347 may operate similar elements 120-170 in FIG. 1. During a response cache initialization operation for the response cache 394, such as may be performed when the QA system is initialized or in response to the occurrence of an event, such as an update to the guidelines in the corpus 347, a user initiated initialization, expiration of a specified time period, or the like, the intelligent response caching engine 390 performs its operations for generating caching buckets and associating corresponding responses with caching buckets and their associated cache keys as described previously. As discussed above, the operation involves the identification of response attributes 392 to be utilized for generating the caching buckets.

These response attributes 392 may be provided as explicit specifications of the response attributes as part of an input, e.g., user specified, a data structure indicating the attributes to be used, or the like. Alternatively, or in addition, the response attributes 392 may be automatically identified via analysis of the corpus or corpora 345, 347 including frequency analysis and statistical analysis of the usage of response attributes within the corpus or corpora 345, 347.

The intelligent response caching engine 390 operates on the guidelines in the corpus or corpora 345, 347 to identify responses and their corresponding response attributes as well as ranges of values for the response attributes, which match the response attributes 392. The intelligent response caching engine 390 generates caching buckets based on these ranges of values of the response attributes, generates cache key entries for the caching buckets based on the values of the response attributes and their corresponding values, and caches the response entries in the response cache 394 indexed by the cache key entry such that a plurality of responses corresponding to the same bucket are associated with the same cache key entry. It should be appreciate that because of the cache bucket approach based on response attributes, the size of the response cache 394 is reduced since a separate entry is not required for each possible permutation. This increases the speed of accessing the response cache 394 and locating correct responses to input questions 310.

As shown in FIG. 3, in view of the description of a QA system pipeline 300 above, when presented with a new input question 310 during runtime, rather than, or as part of a parallel operation to, querying the corpus or corpora 345, 347 to identify hypotheses and candidate answers as well as performing evidence scoring, synthesis, and final confidence merging and ranking 370, at an early stage of the QA system pipeline 300 operation, such as in the question decomposition stage 330, the attributes of the input question 310 may be provided to the response cache lookup engine 395 which may generate a hash value based on the question attributes to perform a lookup of a cache key entry in the response cache 394. The corresponding cached answers (responses) that correspond to the cache key entry matching the hash of the question attributes are returned to the response cache lookup engine 396 which may then perform additional analysis or filtering of the set of cached answers to select one or more cached answers to be returned to the QA system pipeline 300 as a correct answer for the input question 310. This additional analysis/filtering may be performed by correlating the specific values for the question attributes in the input question 310 with values of the cached answer(s) to select those cache answer(s) that match the most values of corresponding attributes in the cached answer(s).

The cached answer(s) that are returned by the response cache lookup engine 396 may be used to circumvent or otherwise avoid the processing cycles required to perform later stages of the QA system pipeline 300 operation, such as stages 340-370. In some cases, if multiple cached answer(s) are returned, some of the operations of evidence scoring and ranking may be used to select from the multiple returned cached answer(s) a final answer to be returned. Alternatively, all of the returned cached answers may be returned as part of the final answer and confidence stage 380 so that the user is informed of all of the valid cached answer(s) corresponding to the input question 310.

Figure 4:
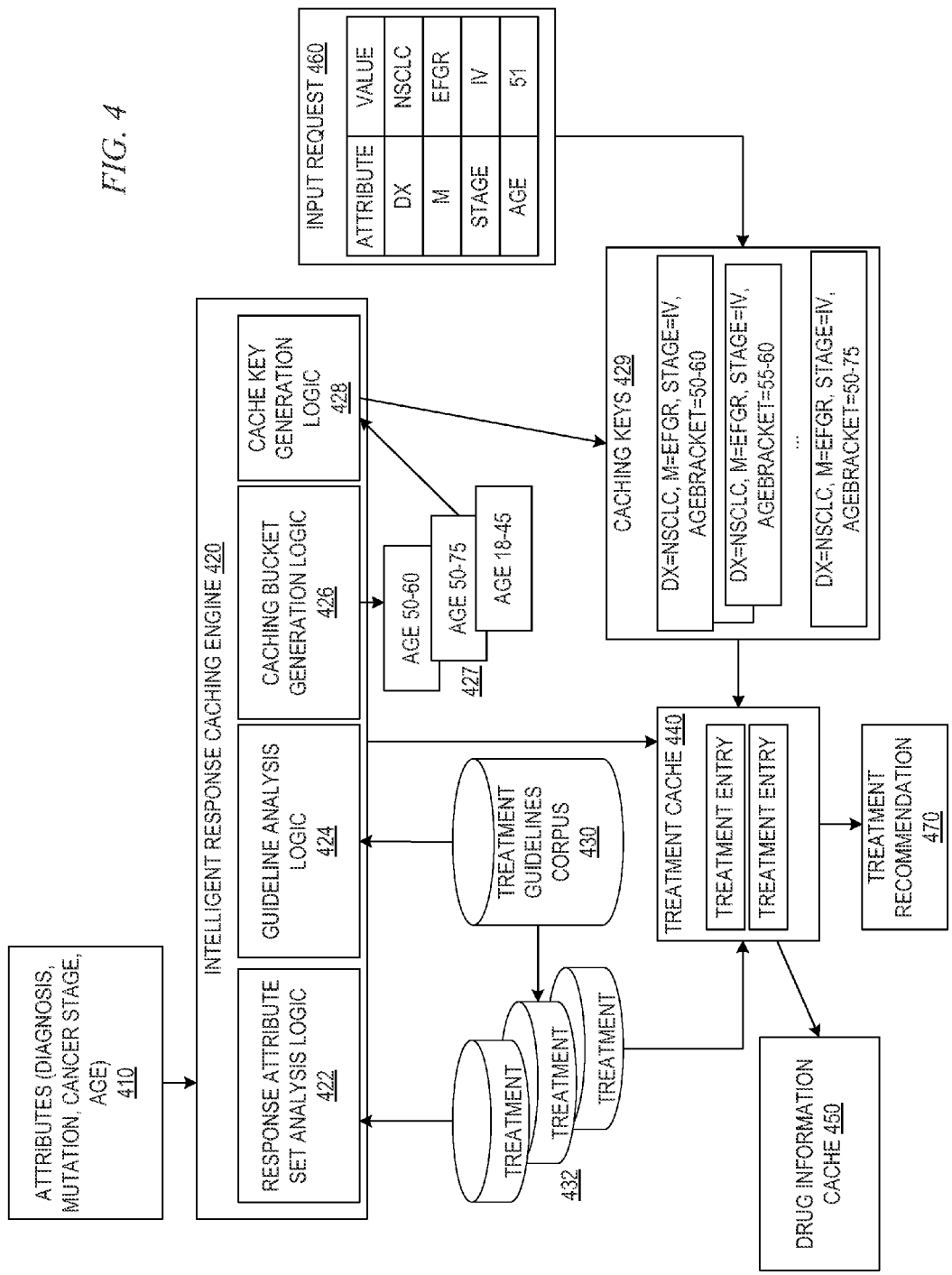
FIG. 4 is an example diagram illustrating an operation for performing intelligent caching of responses in the context of a medical treatment recommendation system in accordance with one illustrative embodiment.

To illustrate the operation of the illustrative embodiments in the context of an example scenario, consider the example provided in FIG. 4. FIG. 4 is an example diagram illustrating an operation for performing intelligent caching of responses in the context of a medical treatment recommendation system in accordance with one illustrative embodiment. In the example shown in FIG. 4, an input of response (or answer) attributes 410 to be used in generating caching buckets comprises 6 Diagnoses (Dx) which have 32 Mutations (M), with 4 Cancer Stages (Stage), and an Age Range from 18-70 (adults), where this age range is broken into Age Brackets. This discrete set of response attributes is broken into criteria for the cache key or a hash for the cache key entry 429 of the treatment cache 440 (response cache). The natural language text guidelines in the corpus are analyzed to identify sets of treatments 432 applicable to the set of attributes 410 for a specific range of a particular attribute, e.g., age or stage for example. For example, medical treatment responses typically fall into buckets corresponding to age ranges or are restricted to a particular stage for a certain type of diagnosis. By identifying one or more key attributes in the set of attributes 410 to utilize for generating caching buckets, more discrete buckets are identifiable. Alternative mechanisms may involve using frequency analysis against the guidelines to identify attributes, using statistical analysis of the typical data points around an attribute across all treatments (responses) that use that attribute to help determine the attribute to use, or the like.

Thus, for example, having identified, by the response attribute set analysis logic 422, age as a key attribute to be used to generate caching buckets, based on analysis of the treatments 432 in the treatment guidelines corpus 430, the treatment guidelines corpus 430 is further analyzed by the guideline analysis logic 424 to identify ranges of this key attribute specified in the treatments 432. Using age as an example, the natural language text of the treatment guidelines 430 is analyzed to identify statements indicative of ranges associated with treatments such as "Patient must be over 50", "Patient is between 50 and 60", "Patient is an adult male less than 50 years old", etc. Similarly, the natural language text may be analyzed to identify exclusions with regard to the key attribute, i.e. age in this example. Such exclusionary statements may be of the type "Patient should not be over 60 years old" or "Patient should not be a child or adolescent and should not be older than 65 years of age", etc. Of course various synonyms, antonyms, key terms, phrases, and the like that are indicative of various alternative phrasing of such range identifications may be used without departing from the spirit and scope of the illustrative embodiments.

These ranges are provided to the caching bucket generation logic 426 which generates buckets 427 for each of the identified ranges. The caching buckets are normalized by combining similar or overlapping buckets yet maintaining separate sub-buckets or separate alternative buckets for ranges that have significant number of members relative to the buckets with which they are similar or overlap, e.g., if a first bucket corresponds to the range 50-60 and a second bucket corresponds to the range 55-60, and 70% (or some other pre-defined threshold number) of the treatments fall within the second bucket, then this second bucket may be maintained as a sub-bucket or separate bucket from the first. There may be instances where the ranges overlap say 50-60 and 50-75 but the set of responses (answers) do not overlap thus, the buckets associated with these responses (answers) would require their own hash key and will not be normalized.

The buckets 427 are provided to the cache key generation logic 428 which generates a cache key entry 429, e.g., a hash, in which the bucket is treated as part of the cache key along with the core set of attributes 410. The corresponding treatments falling into the bucket are stored in the treatment cache 440 in entries corresponding to the bucket's cache key entry 429. Moreover, the treatments 432 cached in the treatment cache 440 may be further analyzed to identify any additional data, such as drug label information, referenced by the treatments 432 which can be cached in a sub-cache, such as drug information cache 450, shared between the treatment entries in the treatment cache 440. The identification of this additional data may be based on a most frequently referred to set of additional data, e.g., most frequently referred to drugs in treatment entries of the cache 440 as well as statistical key performance values, such as contraindications, patient education sheets, etc. In such a case, the statistical key performance values are derived from how large the set of contraindications or patient education sheets are and how long they take to be transferred over the network from a non-cache storage.

Having generated caching keys 429 and populated the treatment cache 440 with treatments based on the caching buckets 427 and caching keys 429, if a subsequent input request 460 is provided that specifies a set of attributes, then a cache lookup operation is performed using the caching keys 429. For example, the input request 460 may be a natural language question, structured request, or the like, that includes a designation of the attributes 410 and their corresponding values for a particular patient, e.g., "What is the correct treatment for a 51 year old patient diagnosed with stage IV Non-Small Cell Cancer (NSCLC) and with EFGR mutation?" The input request 460 is analyzed by the cognitive system (not shown) to extract the features of the input request 460 and generate a hash value based on the specified attribute values. This hash value is matched to a caching key 429 which points to a plurality of treatment entries in the treatment cache 440. The corresponding treatment entries in the cache 440 are either returned as treatment recommendation 470 or further analysis of the treatment entries is performed based on the specific values in the input request 460 to identify a subset of one or more of the treatment entries that are a best match for the input request 460. The resulting selected treatment entries are then returned as a treatment recommendation 470 in response to the input request.

FIG. 5 is a flowchart outlining an example operation for intelligent caching of response to requests in accordance with one illustrative embodiment. The operation outlined in FIG. 5 may be implemented, for example, by an intelligent response caching engine as part of an initialization operation for initializing the response cache and populating it with entries from a corpus comprising guidelines for generating responses to requests. This initialization operation may be instigated in response to an initial configuration of the cognitive system, in response to the occurrence of an event, such as a change in the guidelines, an elapsed amount of time, an explicit instruction from a user to initialize the response cache, another cache flush event, or the like.

As shown in FIG. 5, the operation starts by receiving a set of attributes for use in generating caching buckets (step 510). As noted above, these may be input or automatically generated from a corpus or corpora. The attributes are analyzed based on natural language textual guidelines to identify key attributes for cache bucket generation (step 520). The key attributes are used to identify buckets based on ranges of the key attributes found in the guidelines (step 530). The buckets are normalized into a bucket set that is used for caching purposes (step 540). Cache keys are generated for each of the buckets (step 550) and the responses corresponding to the entries in the guidelines are cached in association with their corresponding buckets' cache keys (step 560). The operation then terminates.

FIG. 6 is a flowchart outlining an example operation for retrieving a response from a response cache in accordance with one illustrative embodiment. The operation outlined in FIG. 6 is performed in response to receiving a request to provide a response corresponding to the attribute values specified in the request. For example, the request may be a natural language question or structured request submitted to the cognitive system, e.g., question and answer system, which includes one or more of the attributes used for response caching and a corresponding value for these one or more attributes.

As shown in FIG. 6, the operation starts by receiving the request (step 610). The attribute features are extracted from the natural language text or structure format of the request (step 620) and a hash value is generated by hashing the values of the attribute features (step 630). The hash value is then used to perform a cache key lookup operation to find a matching cache key (step 640). The cached responses associated with the matching cache key are then retrieved from the response cache (step 650) and analyzed based on the attribute feature values in the received request to identify one or more of the retrieved responses that is a best match to the request, e.g., has the largest number of matching and/or closest values to those of the request (step 660). The selected response(s) are then returned as the correct response to the request (step 670). The operation then terminates.

Thus, the illustrative embodiments provide mechanisms for caching responses to requests based on identified permutations across key attributes using intelligent analysis of guidelines associated with the responses. The mechanisms of the illustrative embodiments reduces the number of permutations that must be maintained in the cache by identifying key attributes to be used to generate buckets corresponding to ranges of values of these key attributes. The buckets are associated with a set of corresponding responses and thus, an cache key entry corresponding to the bucket can be used to access a plurality of potentially correct responses which can then be processed further to identify a best matching response for the particular request. This process greatly increases the responsiveness of a cognitive system by reducing the size of the response cache which speeds up the cache lookup process and by eliminating corpus based processing of requests that can be satisfied by retrieving cached responses.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory having instructions which are executed by the processor to implement an intelligent response caching engine, the method comprising:

receiving, by the intelligent response caching engine of the data processing system, a set of attributes to be used to cache responses to requests in a response cache;

analyzing, by the intelligent response caching engine, a corpus of natural language text associated with the responses to requests to identify ranges of values associated with one or more of the attributes in the set of attributes;

generating, by the intelligent response caching engine, a plurality of caching buckets based on the identified ranges of values associated with the one or more attributes;

generating, by the intelligent response caching engine, for each caching bucket in the plurality of caching buckets, a corresponding cache key;

storing, by the intelligent response caching engine, responses in the response cache in association with a cache key corresponding to a caching bucket in which the response is a member; and processing, by the intelligent response caching engine, a request by retrieving a cached response from the response cache, wherein analyzing, by the intelligent response caching engine, the corpus of natural language text associated with the responses to requests to identify ranges of values associated with one or more of the attributes in the set of attributes comprises performing natural language processing on text in the natural language text that includes at least one of key words, key phrases, and numerical values indicative of a range of numerical values for the one or more attributes.

2. The method of claim 1, wherein the responses are medical treatments, the corpus of natural language text comprises medical treatment guidelines, and the one or more attributes comprise one or more patient characteristics.

3. The method of claim 1, wherein analyzing the corpus of natural language text comprises:

identifying occurrences of each of the one or more attributes within the corpus of natural language text; and selecting at least one attribute from the one or more attributes for which caching buckets in the plurality of caching buckets are to be generated, wherein the plurality of caching buckets are generated based on the selected at least one attribute.

4. The method of claim 3, wherein identifying occurrences of each of the one or more attributes within the corpus of natural language text comprises identifying an inverse document frequency of the one or more attributes and selecting the at least one attribute comprises selecting the at least one attribute based on the inverse document frequency.

5. The method of claim 1, wherein generating, by the intelligent response caching engine, the plurality of caching buckets based on the identified ranges of values associated with the one or more attributes comprises normalizing caching buckets in the plurality of caching buckets that have overlapping ranges of values of the one or more attributes.

6. The method of claim 1, wherein processing, by the intelligent response caching engine, the request by retrieving the cached response from the response cache comprises:
    generating a hash value based on attributes specified in the request;
    performing a lookup operation in the response cache based on the hash value and cache key entries associated with caching buckets in the response cache;
    identifying a caching bucket associated with a cache key entry that matches the hash value; and
    returning a plurality of responses associated with the identified caching bucket as potentially correct requests for responding to the request.

7. The method of claim 6, wherein processing, by the intelligent response caching engine, the request by retrieving the cache response from the response cache further comprises:
    selecting a response from the plurality of responses returned based on specific values associated with the attributes specified in the request.

8. The method of claim 1, wherein the data processing system implements a medical treatment recommendation system of which the intelligent response caching engine is a part and provides treatment recommendations for patients based on the caching buckets in the response cache.

9. The method of claim 1, wherein the data processing system implements a question and answer (QA) system of which the intelligent response caching engine is a part and provides answers to questions submitted by users based on the caching buckets in the response cache.

10. A computer program product comprising a computer readable storage medium having a computer readable program stored therein, wherein the computer readable program, when executed on a computing device, causes the computing device to implement an intelligent response caching engine that operates to:
    receive a set of attributes to be used to cache responses to requests in a response cache;
    analyze a corpus of natural language text associated with the responses to requests to identify ranges of values associated with one or more of the attributes in the set of attributes;
    generate a plurality of caching buckets based on the identified ranges of values associated with the one or more attributes;
    generate, for each caching bucket in the plurality of caching buckets, a corresponding cache key;
    store responses in the response cache in association with a cache key corresponding to a caching bucket in which the response is a member; and
    process a request by retrieving a cached response from the response cache, wherein analyzing the corpus of natural language text associated with the responses to requests to identify ranges of values associated with one or more of the attributes in the set of attributes comprises performing natural language processing on text in the natural language text that includes at least one of key words, key phrases, and numerical values indicative of a range of numerical values for the one or more attributes.

11. The computer program product of claim 10, wherein the responses are medical treatments, the corpus of natural language text comprises medical treatment guidelines, and the one or more attributes comprise one or more patient characteristics.

12. The computer program product of claim 10, wherein analyzing the corpus of natural language text comprises:
    identifying occurrences of each of the one or more attributes within the corpus of natural language text; and
    selecting at least one attribute from the one or more attributes for which caching buckets in the plurality of caching buckets are to be generated, wherein the plurality of caching buckets are generated based on the selected at least one attribute.

13. The computer program product of claim 12, wherein identifying occurrences of each of the one or more attributes within the corpus of natural language text comprises identifying an inverse document frequency of the one or more attributes and selecting the at least one attribute comprises selecting the at least one attribute based on the inverse document frequency.

14. The computer program product of claim 10, wherein generating the plurality of caching buckets based on the identified ranges of values associated with the one or more attributes comprises normalizing caching buckets in the plurality of caching buckets that have overlapping ranges of values of the one or more attributes.

15. The computer program product of claim 10, wherein processing the request by retrieving the cached response from the response cache comprises:
    generating a hash value based on attributes specified in the request;
    performing a lookup operation in the response cache based on the hash value and cache key entries associated with caching buckets in the response cache;
    identifying a caching bucket associated with a cache key entry that matches the hash value; and
    returning a plurality of responses associated with the identified caching bucket as potentially correct requests for responding to the request.

16. The computer program product of claim 15, wherein processing the request by retrieving the cache response from the response cache further comprises:
    selecting a response from the plurality of responses returned based on specific values associated with the attributes specified in the request.

17. The computer program product of claim 10, wherein the computing device implements a medical treatment recommendation system of which the intelligent response caching engine is a part and provides treatment recommendations for patients based on the caching buckets in the response cache.

18. An apparatus comprising:
    a processor; and
    a memory coupled to the processor, wherein the memory comprises instructions which, when executed by the processor, cause the processor to implement an intelligent response caching engine that operates to:

receive a set of attributes to be used to cache responses to requests in a response cache;

analyze a corpus of natural language text associated with the responses to requests to identify ranges of values associated with one or more of the attributes in the set of attributes;

generate a plurality of caching buckets based on the identified ranges of values associated with the one or more attributes;

generate, for each caching bucket in the plurality of caching buckets, a corresponding cache key;

store responses in the response cache in association with a cache key corresponding to a caching bucket in which the response is a member; and process a request by retrieving a cached response from the response cache, wherein analyzing the corpus of natural language text associated with the responses to requests to identify ranges of values associated with one or more of the attributes in the set of attributes comprises performing natural language processing on text in the natural language text that includes at least one of key words, key phrases, and numerical values indicative of a range of numerical values for the one or more attributes.

* * * * *